United States Patent
Lohmueller

(10) Patent No.: US 6,198,310 B1
(45) Date of Patent: Mar. 6, 2001

(54) CIRCUIT ARRANGEMENT FOR MONITORING A CLOCK-TIMED LOAD

(75) Inventor: Horst Lohmueller, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/241,244

(22) Filed: Feb. 1, 1999

(30) Foreign Application Priority Data

Feb. 5, 1998 (DE) .............................................. 198 04 407

(51) Int. Cl.$^7$ ...................................................... H03K 5/19
(52) U.S. Cl. ............................ 327/20; 327/18; 327/37; 327/57; 327/60
(58) Field of Search ................................. 327/20, 17, 18, 327/37, 57, 58, 60, 70, 74, 3, 7

(56) References Cited

U.S. PATENT DOCUMENTS

| | | | |
|---|---|---|---|
| 5,189,379 | * 2/1993 | Saito et al. | 331/1 A |
| 5,680,265 | * 10/1997 | Noguchi | 327/37 |
| 5,737,140 | * 4/1998 | Carr | 327/37 |
| 5,867,051 | * 2/1999 | Liu | 327/333 |

FOREIGN PATENT DOCUMENTS

| | | |
|---|---|---|
| 195 29 363 | 2/1997 | (DE) . |
| 195 46 682 | 6/1997 | (DE) . |

* cited by examiner

Primary Examiner—Timothy P. Callahan
Assistant Examiner—An T. Luu
(74) Attorney, Agent, or Firm—Kenyon & Kenyon

(57) ABSTRACT

A circuit arrangement for monitoring a load operated with a clock signal is provided. The circuit arrangement may be applied to the field of automotive engineering. The circuit arrangement includes a comparator having at least two inputs and one output. The circuit arrangement further includes a D-flip-flop having one clock input, one signal input, and one output. At least a first input of the comparator is coupled to the load signal. The output of the comparator is coupled to the signal input of the D-flip-flop. The clock input of the D-flip-flop is coupled to the clock signal. The output of the D-flip-flop delivers a monitoring signal.

13 Claims, 2 Drawing Sheets

CIRCUIT ARRANGEMENT FOR MONITORING A CLOCK-TIMED LOAD

FIELD OF THE INVENTION

The present invention relates to a circuit arrangement for monitoring a load operated with a clock signal, a load signal being used for the monitoring. The present invention is usable in the field of motor vehicle electronics, for example.

BACKGROUND INFORMATION

In many fields, increasing use is being made of clock-timed systems for energy balance reasons. This applies in particular to the motor vehicle field, and, in that context, especially for the operation of inductive loads. In many fields it is also essential or at least advantageous to monitor these clock-timed systems while they are operating. A great variety of corresponding monitoring systems and circuit arrangements for monitoring are known.

U. Tietze and Ch. Schenk: "Halbleiter-Schaltungstechnik" (Semiconductor circuit technology), Springer-Verlag, Berlin, Heidelberg, N.Y., describes numerous basic electronic circuits. Reference is made at this juncture to the chapter "Schaltwerke (Sequentielle Logik)" (Switching mechanisms (sequential logic)) on pages 232 ff. of the 10th edition of the aforementioned book. On page 234 f., a D-flip-flop is described as an example of a basic circuit.

Braking systems implemented in motor vehicles may be clock-timed systems in which the circuit arrangement according to the present invention can be used, for example. German Patent Application No. 195 46 682 describes a hydraulic braking system for performing a driver-independent and wheel-selective braking action. German Patent Application No. 195 29 363 describes a hydraulic braking system of an ABSR system.

It is of course also possible to use the circuit arrangement according to the present invention in a pneumatic braking system.

What is problematic in terms of monitoring of a clock-timed load is that a load signal used for monitoring is also present as a clock-timed signal. In conventional arrangements, the clock-timed load signal that is to be monitored is connected to an input of a microcomputer or microcontroller. At each active clock phase, the microcomputer checks whether the clock-timed load signal to be monitored conforms to the required value.

A disadvantage of the conventional arrangements is that correspondingly fast inputs of the microcomputer must be made available for monitoring the clock-timed load signal. During each active clock phase (which in some cases can be very short), the microcomputer must check whether the clock-timed load signal that is present conforms to a given value. This requires a high level of circuit engineering complexity. Monitoring systems of this kind are correspondingly complex and cost-intensive to implement. A further disadvantage is that monitoring arrangements of this kind have high power consumption due to the high processing speed required.

SUMMARY OF THE INVENTION

It is an object of the present invention to make available a circuit arrangement for monitoring a load operated with a clock signal which has a simple and economical design and which reliably guarantees monitoring of the load even when active clock phases are short.

In accordance with an exemplary embodiment of the present invention, a circuit arrangement for monitoring a load operated with a clock signal is provided. The circuit arrangement includes a comparator having at least two inputs and one output, and a D-flip-flop having one clock input, one signal input, and one output. At least a first input of the comparator is coupled to the load signal. The output of the comparator is coupled to the signal input of the D-flip-flop. The clock input of the D-flip-flop is coupled to the clock signal. The output of the D-flip-flop delivers a monitoring signal. An advantage of this circuit arrangement is that with minimal circuit-engineering outlay, it makes available a quasi-static monitoring signal for fault situations and for fault-free operation. The requirement to make a fast microcomputer input available can thus be eliminated. Because of the characteristics of the D-flip-flop, the circuit arrangement according to the present invention reacts to the applied input signal, i.e., to the clock-timed load signal that is to be monitored, only during the active clock phases. A quasi-steady-state logic signal, which assumes the value of a logical one or a logical zero in accordance with the presence of a fault, is delivered at the output of the D-flip-flop. A further advantage is that the circuit arrangement inherently checks, during each phase of the clock signal, whether or not a fault is present. In particular, the circuit arrangement is capable of resetting an output signal that has been set (for example to logical one) because a fault has occurred, if the fault does not occur again in a subsequent clock cycle. Setting and resetting of the output signal are thus accomplished automatically in accordance with the presence of a fault situation or the presence of a normal operating state. The output signal made available by the circuit arrangement can be processed further by a control device or by a microcomputer.

In a braking system, for example, the further processing may be as follows: if the output signal indicates a fault, the corresponding function that is performed by the control device and for which the monitored load (in this case the valve) is necessary but faulty, can be deactivated. The control device can also go into a so-called emergency mode.

In a exemplary embodiment of the invention, a reference signal is applied to a second input of the comparator, this reference signal preferably being adjustable. This has the advantage that the load signal to be monitored can be monitored with reference to an arbitrarily adjustable reference signal. For example, with a circuit arrangement of this kind it is possible to monitor whether the load signal lies above or below an arbitrarily selected reference signal. It is particularly advantageous that the reference voltage is adjustable, since the reference signal can thereby be adapted to various loads. Moreover, the reference signal can also be adapted to various operating states of the load. This allows particularly reliable monitoring of the load to be achieved, in a manner adapted to each operating state. The reference voltage, in particular, the controllable reference voltage, can be made available by, for example, a voltage source, a voltage divider, or a current source with a connected load resistor.

In a further exemplary embodiment of the present invention, the reference signal is also a clock-timed signal. The advantage in this context is that the power consumption of the circuit arrangement is further reduced because the reference signal is clock-timed. It is furthermore advantageous that with this configuration, a clock-timed voltage is present at both inputs of the comparator, so that any initial transients compensate for one another.

In a further exemplary embodiment of the present invention, the comparator is a window comparator in which two different reference voltages are applied to two second inputs. This has the advantage that the load signal to be monitored can be checked as to whether it lies within a signal range defined by the two reference voltages. The flexibility of the circuit arrangement is thereby increased, and in particular it is possible to specify various fault types which affect the load signal in different ways.

In a further exemplary embodiment of the present invention, the load is an inductive load, in particular a valve in a motor vehicle, the load signal to be monitored being the current flowing through the load. It is advantageous in this context that the circuit arrangement according to the present invention can also be used with inductive loads. This eliminates, in particular, the large outlay in terms of circuit engineering that usually must be made for the monitoring of inductive loads, since conventional monitoring systems detect the load current in the free-running circuit with the load driver switched off, which leads to technical problems or inaccuracies because of the high voltage (which is higher than the supply voltage) that occurs.

In a further exemplary embodiment of the present invention, the clock signal is pulse-width modulated. The advantage in this context is that the load is controlled in terms of its output by way of the pulse-width modulation. It is furthermore advantageous that with the circuit arrangement according to the present invention, monitoring of the load is accomplished independently of the modulation depth.

In a further exemplary embodiment of the present invention, the D-flip-flop is enhanced by circuit-engineering supplementation to yield a master-slave flip-flop. This circuit-engineering enhancement can be accomplished with conventional, commercially available components. It is advantageous in this context that the input state is buffered, and is not transferred to the output until the input is inhibited by the next clock phase. This prevents the output signal from reacting during the active clock phase to changing input signals. The output state is governed by the input state at the end of the active clock phase. Advantageously, initial transients which occur in particular with capacitative or inductive loads are effectively suppressed. The output state is stable, and is constant at least for one clock phase.

In a further advantageous embodiment of the present invention, the circuit arrangement is integrated monolithically or on a hybrid basis. This has the advantage that manufacturing costs can be reduced, and the reliability of the circuit arrangement can thereby be greatly increased. It is furthermore advantageous that the circuit arrangement can be integrated together with a control device, for example a microprocessor, on one component. Monolithic integration, for example in silicon, or hybrid integration, for example on a ceramic substrate, are possibilities for integration.

The present invention also includes the use of a D-flipflop for monitoring a load operated in clock-timed fashion. For this, any commercially available D-flip-flop can be wired so that the clock input of the D-flip-flop is applied to the clock signal of the load, and the signal input or data input of the D-flip-flop is connected, directly or via a comparator, to the signal being monitored. The advantage in this context is that the D-flip-flop monitors the signal being monitored only during each active clock phase. The advantages recited above regarding the circuit arrangement according to the present invention also apply to the use according to the present invention of a D-flip-flop.

DETAILED DESCRIPTION

Figure 1:
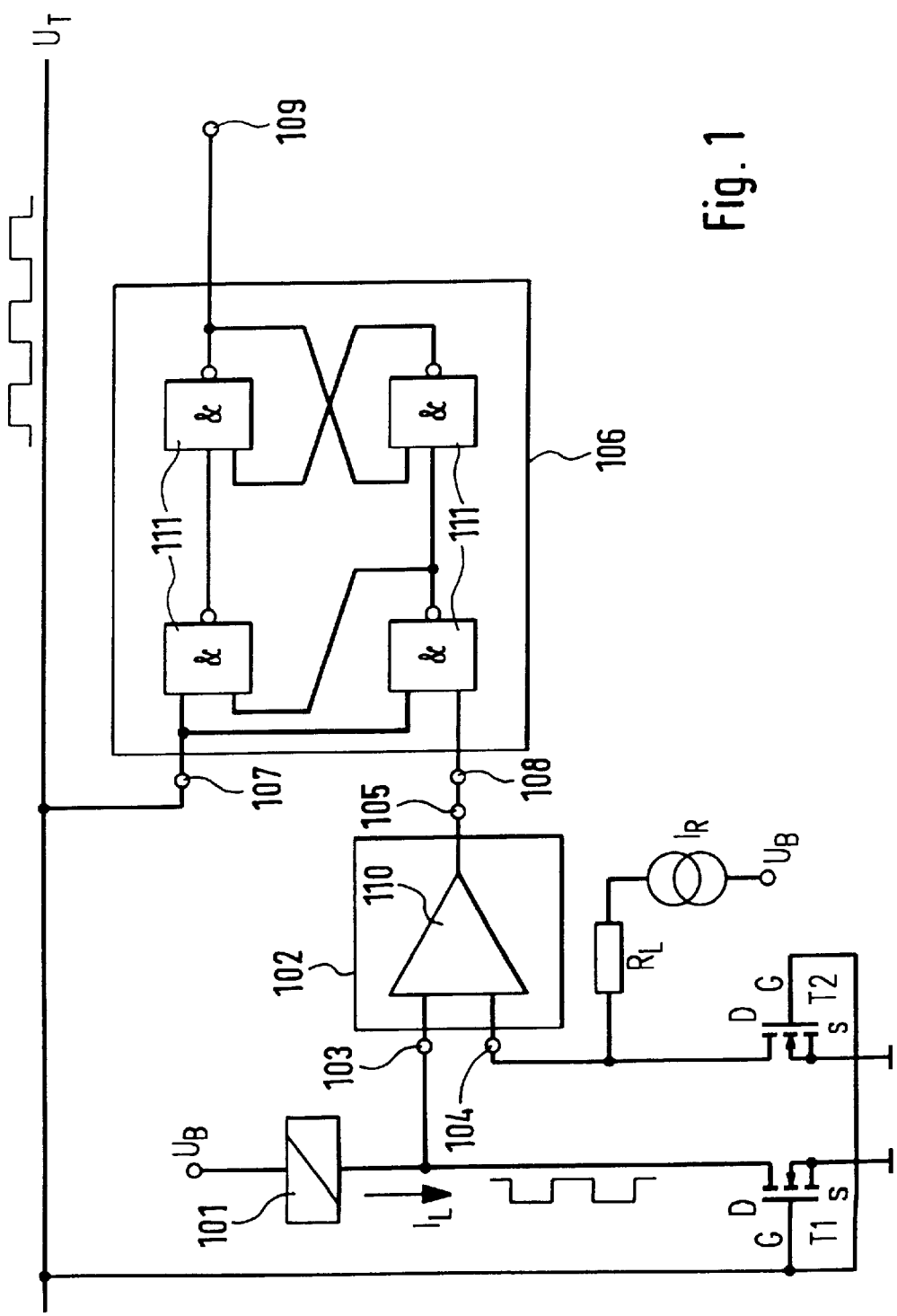
FIG. 1 shows a circuit arrangement according to the present invention, having a comparator and a D-flip-flop.

FIG. 1 shows the circuit arrangement according to the present invention for monitoring a load 101 driven with a clock signal UT. A load signal IL is used for monitoring. The circuit arrangement includes a comparator 102 having at least two inputs 103, 104 and an output 105, and a D-flipflop 106 having a clock input 107, a signal input 108, and an output 109. At least a first input 103 of comparator 102 is coupled to load signal IL. Output 105 of comparator 102 is coupled to signal input 108 of D-flip-flop 106. Clock input 107 of D-flip-flop 106 is coupled to clock signal UT. Output 109 of D-flip-flop 106 delivers a monitoring signal.

Clock signal UT is applied to the two gate electrodes of the two transistors T1, T2. In the cycle of clock signal UT, transistor T1 switches load 101, which is connected at one electrode to battery voltage UB, to ground. The resulting clock-timed current IL, as it flows through the drain-source section of transistor T1, causes a voltage drop which represents the load signal to be monitored and which is connected to first input 103 of comparator 102. In the cycle of clock voltage UT, transistor T2 switches load resistor RL and current source IR wired in series with it, which is connected at one electrode to battery voltage UB, to ground. The resulting clock-timed current causes a voltage drop across the drain-source section of transistor T2 which is fed as a reference signal to second input 104 of comparator 102. The level of this reference signal can be set by way of current source IR. In the simplest case, comparator 102 has an operational amplifier 110. Output 105 of comparator 102 is connected to input 108 of D-flip-flop 106. Clock input 107 of D-flip-flop 106 is connected to clock signal UT. In the example depicted, the D-flip-flop is made up of four NAND gates 111, but it can also be implemented via other gate functions or other components. The monitoring signal is delivered at output 109 of D-flip-flop 106.

Figure 2:
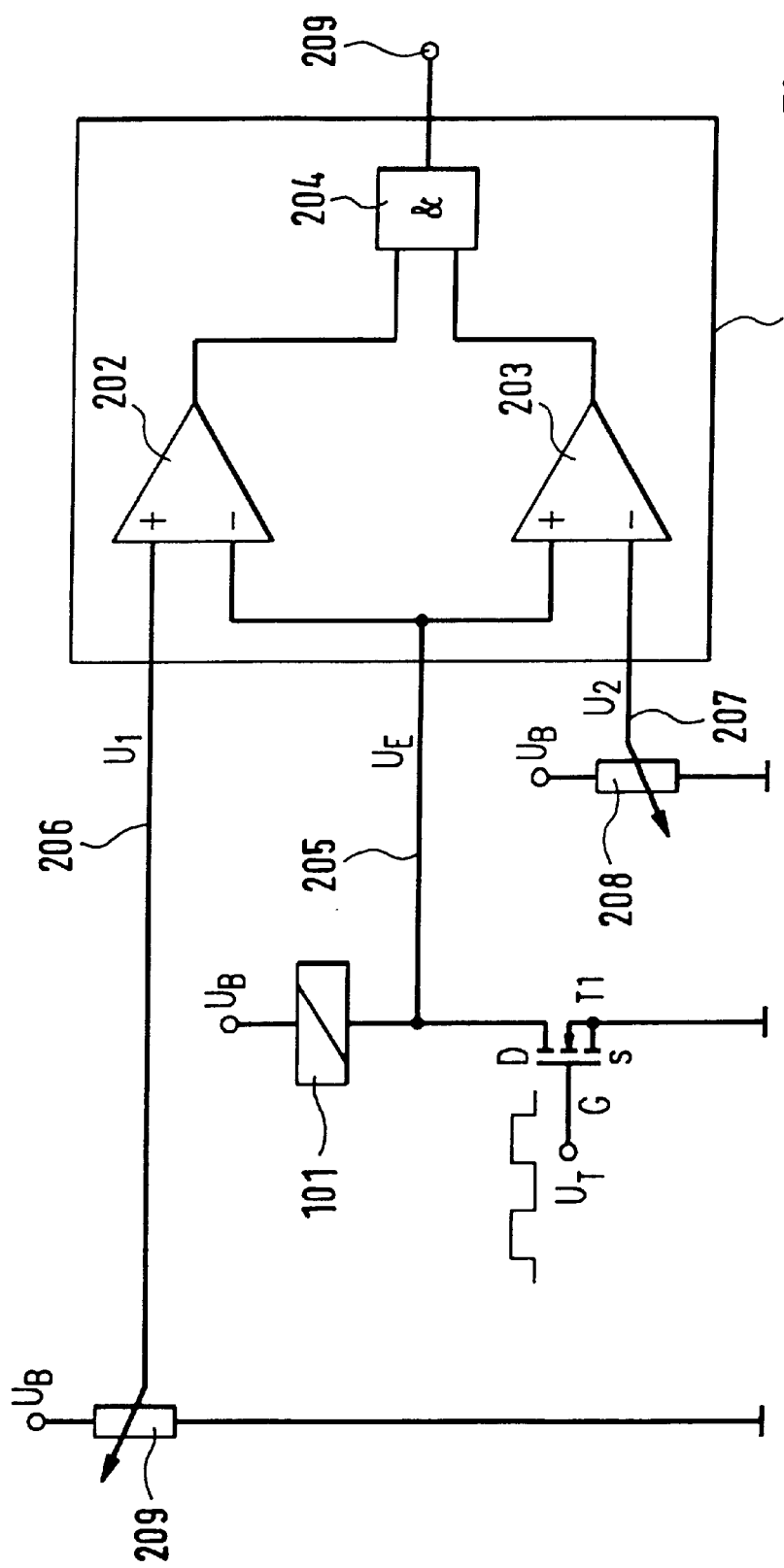
FIG. 2 shows a window comparator.

FIG. 2 shows a window comparator. Window comparator 201 is constructed from two operational amplifiers 202, 203 whose outputs go to the inputs of an AND gate 204. The output of window comparator 209 is to be connected to input 108 of D-flip-flop 106 depicted in FIG. 1. First input 205 of window comparator 201 is in turn coupled to the load signal of load 101 to be monitored. Load 101 is connected at one electrode to battery voltage UB, and at the other electrode is switched to ground via the drain-source section of transistor T1 in the cycle of clock voltage UT present at the gate electrode of transistor T1. The two second inputs 206, 207 of window comparator 201 are respectively connected to the wipers of two potentiometers 208, 209. The potentiometers are each connected between battery voltage UB and ground potential. In the exemplary embodiment depicted, the potentiometers are set so that U1>U2.

In the exemplary embodiment depicted, output signal 209 of window comparator 201 has a logical one value only when the following is true:

$$U2 < UE < U1.$$

What is claimed is:
1. A circuit arrangement for monitoring a load, the load being operated using a clock signal and providing a load signal for monitoring the load, comprising:
  a comparator having at least two inputs and an output, at least a first one of the at least two inputs of the comparator being coupled to receive the load signal; and a D-flip-flop having a clock input, a signal input, and an output, the output of the comparator being coupled to the signal input of the D-flip-flop, the clock input of the D-flip-flop being coupled to receive the clock signal, and the output of the D-flip-flop providing a monitoring signal, wherein the clock signal received by the D-flip-flop is the same clock signal operating the load.

2. The circuit arrangement according to claim 1, wherein a reference signal is applied to a second input of the at least two inputs of the comparator.

3. The circuit arrangement according to claim 2, wherein the reference voltage is adjustable.

4. The circuit arrangement according to claim 2, wherein the reference signal is a clock-timed signal.

5. The circuit arrangement according to claim 1, wherein the comparator includes a window comparator, two different reference voltages are applied to two second inputs of the window comparator.

6. The circuit arrangement according to claim 1, wherein the load includes an inductive load, the inductive load including a valve in a motor vehicle, and wherein the load signal to be monitored is a current flowing through the load.

7. The circuit arrangement according to claim 1, wherein the clock signal is pulse-width modulated.

8. The circuit arrangement according to claim 1, wherein the D-flip-flop is enhanced by circuit-engineering supplementation to yield a master-slave flip-flop.

9. The circuit arrangement according to claim, wherein the circuit arrangement is integrated one of i) monolithically, and ii) on a hybrid basis.

10. A method for monitoring a load, the load being operated using a clock signal and providing a load signal for monitoring the load, the method comprising:

providing a D-flip-flop for monitoring the load;

receiving by a clock input of the D-flip-flop the clock signal, the clock signal received by the clock input of the D-flip-flop being the same as the clock signal operating the load;

receiving by a signal input of the D-flip-flop the load signal; and providing at the output of the D-flip-flop a monitoring signal.

11. A circuit arrangement for monitoring a valve in a motor vehicle, comprising:

a comparator having at least two inputs and an output, at least a first one of the at least two inputs of the comparator being coupled to receive a current flowing through the valve; wherein the load includes an inductive load, the valve being operated using a clock signal; and a D-flip-flop having a clock input, a signal input, and an output, the output of the comparator being coupled to the signal input of the D-flip-flop, the clock input of the D-flip-flop being coupled to receive the clock signal, and the output of the D-flip-flop providing a monitoring signal.

12. The circuit arrangement according to claim 1, further comprising:

a switch coupled to receive the clock signal and coupled to the load, the switch switching the load as a function of the clock signal, the load providing a clock-time load signal for monitoring the load as a function of the switching.

13. The method according to claim 10, further comprising:

switching the load with a switch using the clock signal; and providing a clock-timed load signal from the load a as a function of the switching.

* * * * *